United States Patent
Sawanami et al.

(10) Patent No.: US 12,481,284 B2
(45) Date of Patent: Nov. 25, 2025

(54) AUTOMATIC MOVING DEVICE AND CONTROL METHOD FOR AUTOMATIC MOVING DEVICE

(71) Applicant: FUJI CORPORATION, Chiryu (JP)

(72) Inventors: Hisato Sawanami, Kariya (JP); Koji Kawaguchi, Kasugai (JP); Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 192 days.

(21) Appl. No.: 18/249,122

(22) PCT Filed: Oct. 20, 2020

(86) PCT No.: PCT/JP2020/039407
§ 371 (c)(1),
(2) Date: Apr. 14, 2023

(87) PCT Pub. No.: WO2022/085078
PCT Pub. Date: Apr. 28, 2022

(65) Prior Publication Data
US 2023/0393580 A1 Dec. 7, 2023

(51) Int. Cl.
*G05D 1/00* (2024.01)
*B60W 60/00* (2020.01)

(52) U.S. Cl.
CPC ..... *G05D 1/0214* (2013.01); *B60W 60/00256* (2020.02); *B60W 2300/18* (2013.01);
(Continued)

(58) Field of Classification Search
CPC ...... B62D 57/024; B62D 61/10; B62D 63/02; B62D 49/00; G05D 1/0214; G05D 1/0231;
(Continued)

(56) References Cited

U.S. PATENT DOCUMENTS

2003/0184071 A1* 10/2003 Tokumaru .............. B62D 57/04
280/758
2018/0011493 A1* 1/2018 Terada ................. G05D 1/0214
(Continued)

FOREIGN PATENT DOCUMENTS

CN    108627135 A  * 10/2018   ........... G01B 11/028
JP    2010-167814 A    8/2010
(Continued)

OTHER PUBLICATIONS

Ben Lytwyn: The Herd crossing the Golden Crack (Moab)—YouTube Video Screen-Captures from Nov. 4, 2011 (Year: 2011).*
(Continued)

*Primary Examiner* — Abby Lin
*Assistant Examiner* — Kayla R. Doros
(74) *Attorney, Agent, or Firm* — Oblon, McClelland, Maier & Neustadt, L.L.P.

(57) ABSTRACT

An automatic moving device according to the present disclosure is an automatic moving device that is used in a delivery system for delivering an article and automatically moves the article. The automatic moving device includes a driving section configured to drive a wheel, a detection section configured to detect an obstacle of a road surface, and a control section configured to control the driving section so that the automatic moving device is moved in an oblique direction with respect to a groove when the groove is detected as the obstacle of the road surface, and control the driving section so that the automatic moving device is moved in a direction orthogonal to a step when the step is detected as the obstacle of the road surface.

9 Claims, 11 Drawing Sheets

(52) U.S. Cl.
CPC ..... *B60W 2520/06* (2013.01); *B60W 2552/35* (2020.02); *B60W 2554/60* (2020.02); *B60W 2710/207* (2013.01)

(58) Field of Classification Search
CPC ........ G05D 1/02; G05D 1/021; G05D 1/0238; G05D 1/0891; G05D 1/0246; G05D 1/24; B25J 5/007; B60B 19/003; B60K 17/34; A61G 2203/10; A61G 2203/42; A61G 2203/36; A61G 5/046; A61G 5/061; A61G 5/1089; A61G 2203/70; B60Y 2200/48

See application file for complete search history.

(56) References Cited

U.S. PATENT DOCUMENTS

2020/0069134 A1* 3/2020 Ebrahimi Afrouzi ........................ A47L 9/0472
2020/0247201 A1* 8/2020 Fairclough ........... H01R 13/639
2020/0290603 A1* 9/2020 Sadamoto ........... B60W 30/143

FOREIGN PATENT DOCUMENTS

| JP | 2017015601 A | * | 1/2017 |
| JP | 2017-52299 A | | 3/2017 |
| JP | 2017-111771 A | | 6/2017 |
| JP | 2018-130198 A | | 8/2018 |
| JP | 2019-91148 A | | 6/2019 |

OTHER PUBLICATIONS

Drivingfast: Wayback Machine Archive of website Drivingfast.net from Aug. 13, 2020 (Year: 2020).*

International Search Report issued Jan. 12, 2021 in PCT/JP2020/039407 filed on Oct. 20, 2020, 3 pages.

* cited by examiner

Fig. 4
Fig. 4A
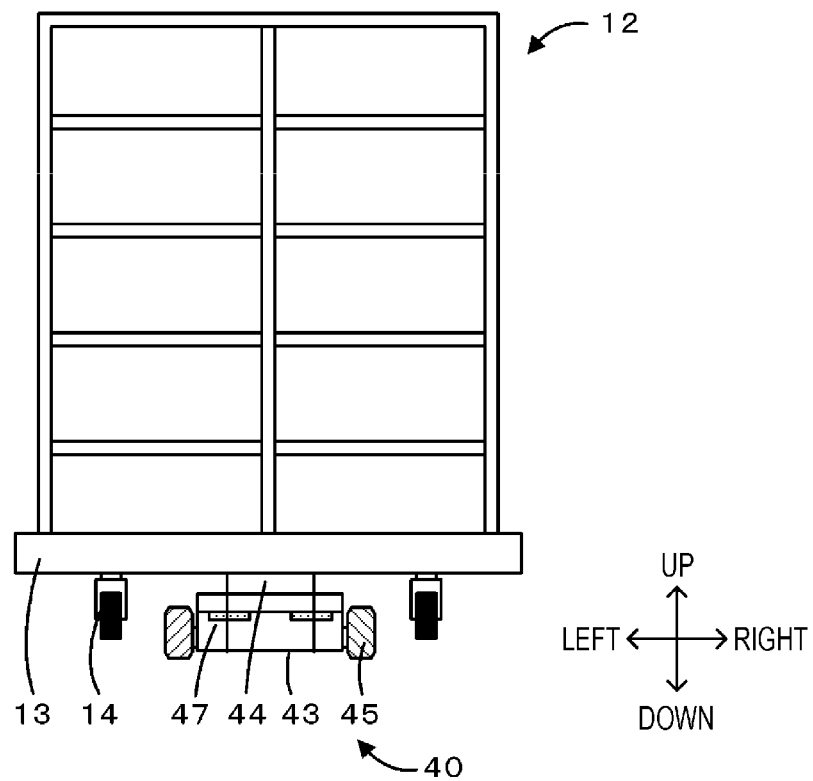
Fig. 4B
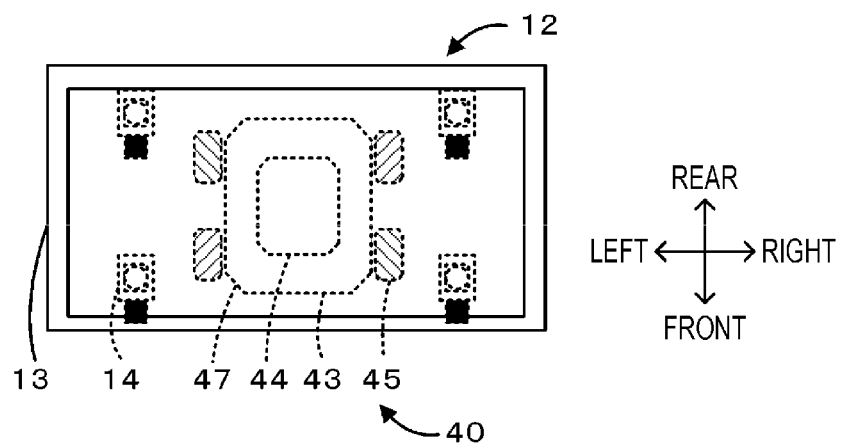

Fig. 7
Fig. 7A
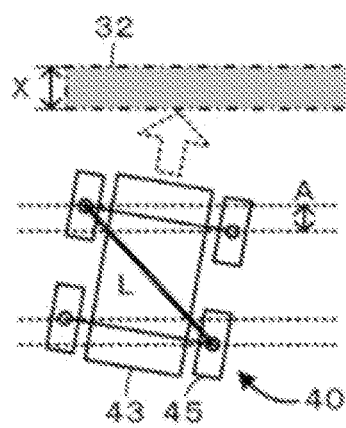
Fig. 7B
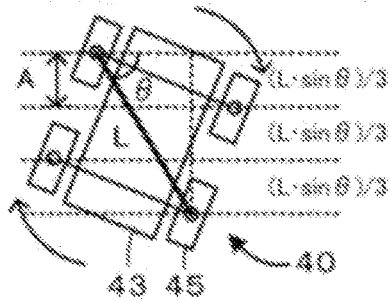
Fig. 7C
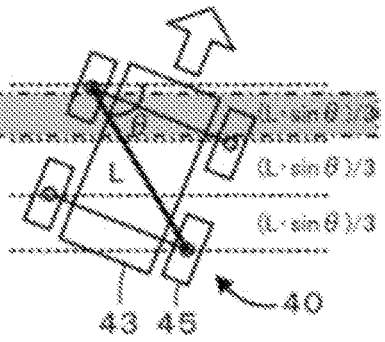
Fig. 7D
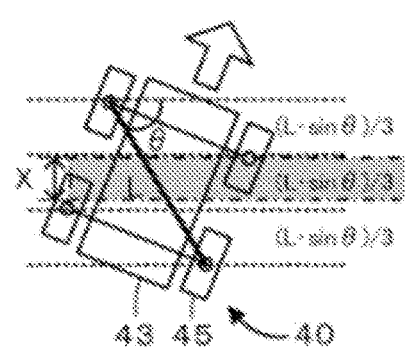
Fig. 7E
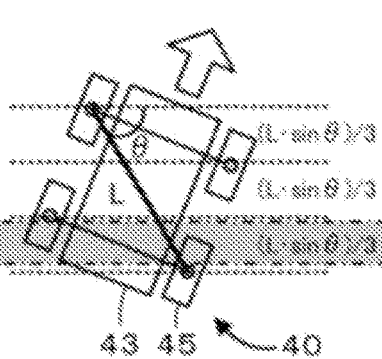
Fig. 7F
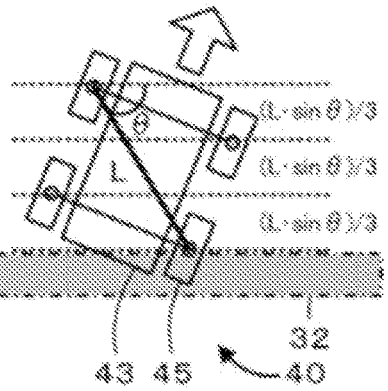
Fig. 7G
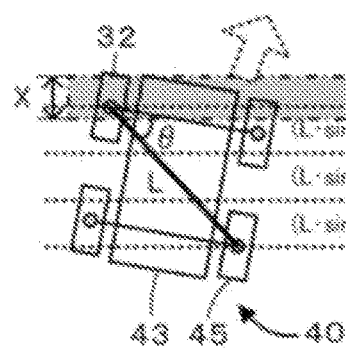
Fig. 7H
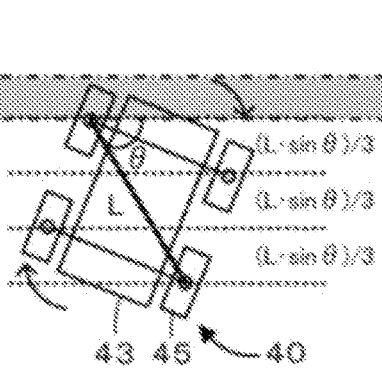
Fig. 7I
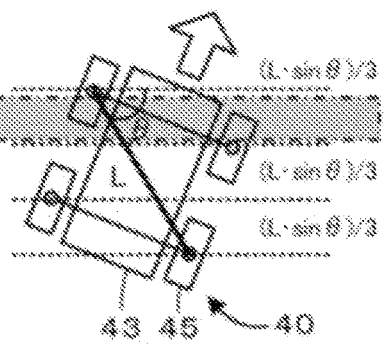

Fig. 10
Fig. 10A  Fig. 10B  Fig. 10C
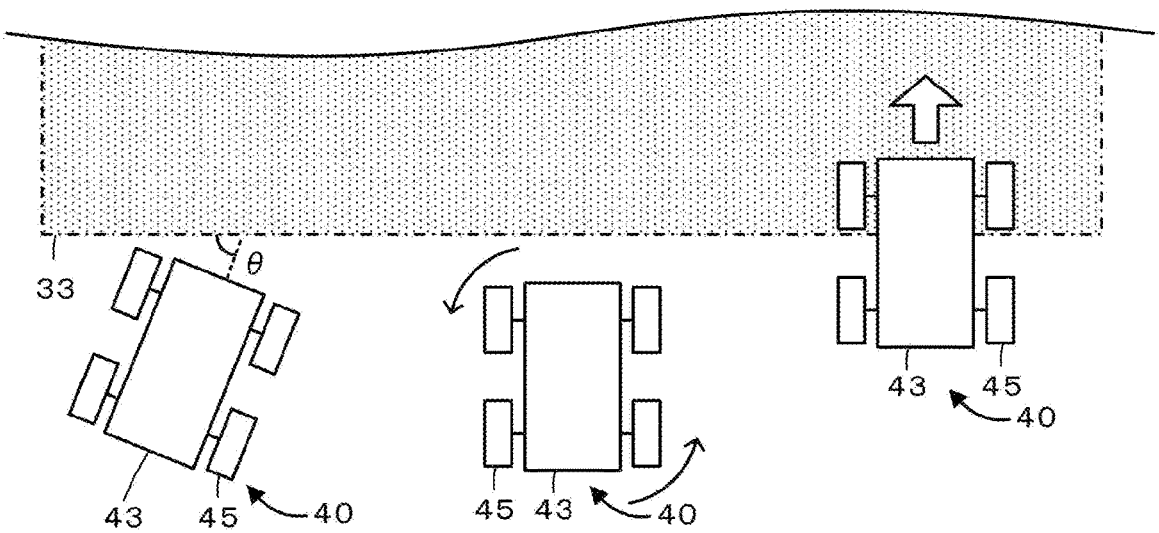
Fig. 10D  Fig. 10E  Fig. 10F
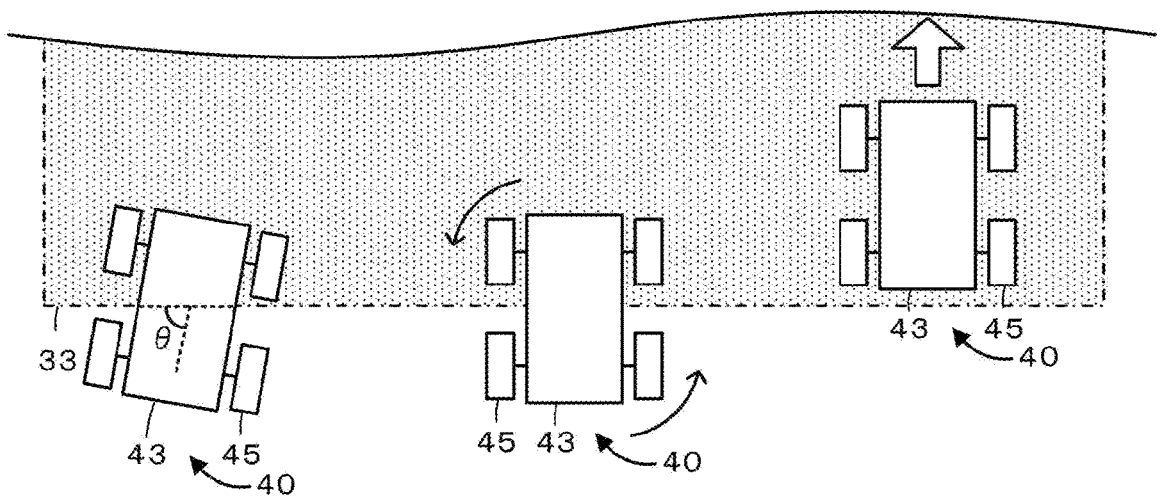

AUTOMATIC MOVING DEVICE AND CONTROL METHOD FOR AUTOMATIC MOVING DEVICE

TECHNICAL FIELD

The present specification discloses an automatic moving device and a control method for an automatic moving device.

BACKGROUND ART

Conventionally, an unmanned conveyance vehicle serving as an automatic moving device for automatically moving an article has been proposed, for example, to acquire angle θ between a longitudinal direction of a step area and a route of the unmanned conveyance vehicle, travel along the route with the forming angle θ, and cancel lock of suspension of a drive wheel or to raise a position of the drive wheel when the drive wheel is present within a predetermined range with respect to the step area for each drive wheel (for example, refer to Patent Literature 1). The unmanned conveyance vehicle is supposed to be capable of providing an unmanned conveyance vehicle capable of driving over a step. In addition, as a self-propelled device, there has been proposed a self-propelled vacuum cleaner having a pair of drive wheels arranged in a left-right direction and a floor distance measurement sensor, in which when approaching the step at a boundary between a first floor and a second floor located at a higher position than the first floor while traveling on the first floor, the self-propelled vacuum cleaner moves backward in a direction away from the step, and then travels toward the step at a higher speed than the speed when traveling on the first floor (for example, refer to Patent Literature 2). The self-propelled device is said to be capable of improving a ride-over ability of the step.

PATENT LITERATURE

Patent Literature 1: JP-A-2019-91148
Patent Literature 2: JP-A-2018-130198

BRIEF SUMMARY

Technical Problem

However, as in the above Patent Literatures 1 and 2, there has been considered a device capable of moving the step, but that is not yet sufficient and there has been obtained an automatic moving device that can more appropriately travel against an obstacle on a road surface.

The present disclosure has been made to solve such problems, and a main object of the present disclosure is to provide an automatic moving device and a control method for an automatic moving device that can more appropriately travel against an obstacle of a road surface.

The present disclosure adopts the following means to achieve the main object described above.

The automatic moving device disclosed in the present specification is an automatic moving device used in a delivery system for delivering an article and automatically moving the article, the automatic moving device including:
  a driving section configured to drive a wheel;
  a detection section configured to detect an obstacle of a road surface; and
  a control section configured to control the driving section so that the automatic moving device is moved in an oblique direction with respect to a groove when the groove is detected as the obstacle of the road surface, and control the driving section so that the automatic moving device is moved in a direction orthogonal to a step when the step is detected as the obstacle of the road surface.

In this automatic moving device, when the groove is detected as the obstacle of the road surface, the automatic moving device is adjusted so as to be in the oblique direction with respect to the groove, and passes through the groove. On the other hand, in this automatic moving device, when the step is detected as the obstacle of the road surface, the automatic moving device is adjusted in the direction orthogonal to the step, and passes through the step. Therefore, the automatic moving device can more appropriately travel against the obstacle of the road surface.

BRIEF DESCRIPTION OF DRAWINGS

FIG. 4 is an explanatory view of automatic moving device 40 connected to cart 12.
FIG. 7 is an explanatory view illustrating an example of an angle adjustment of automatic moving device 40.
FIG. 10 is an explanatory view illustrating an example of process that passes through a step of automatic moving device 40.

DESCRIPTION OF EMBODIMENTS

Figure 1:
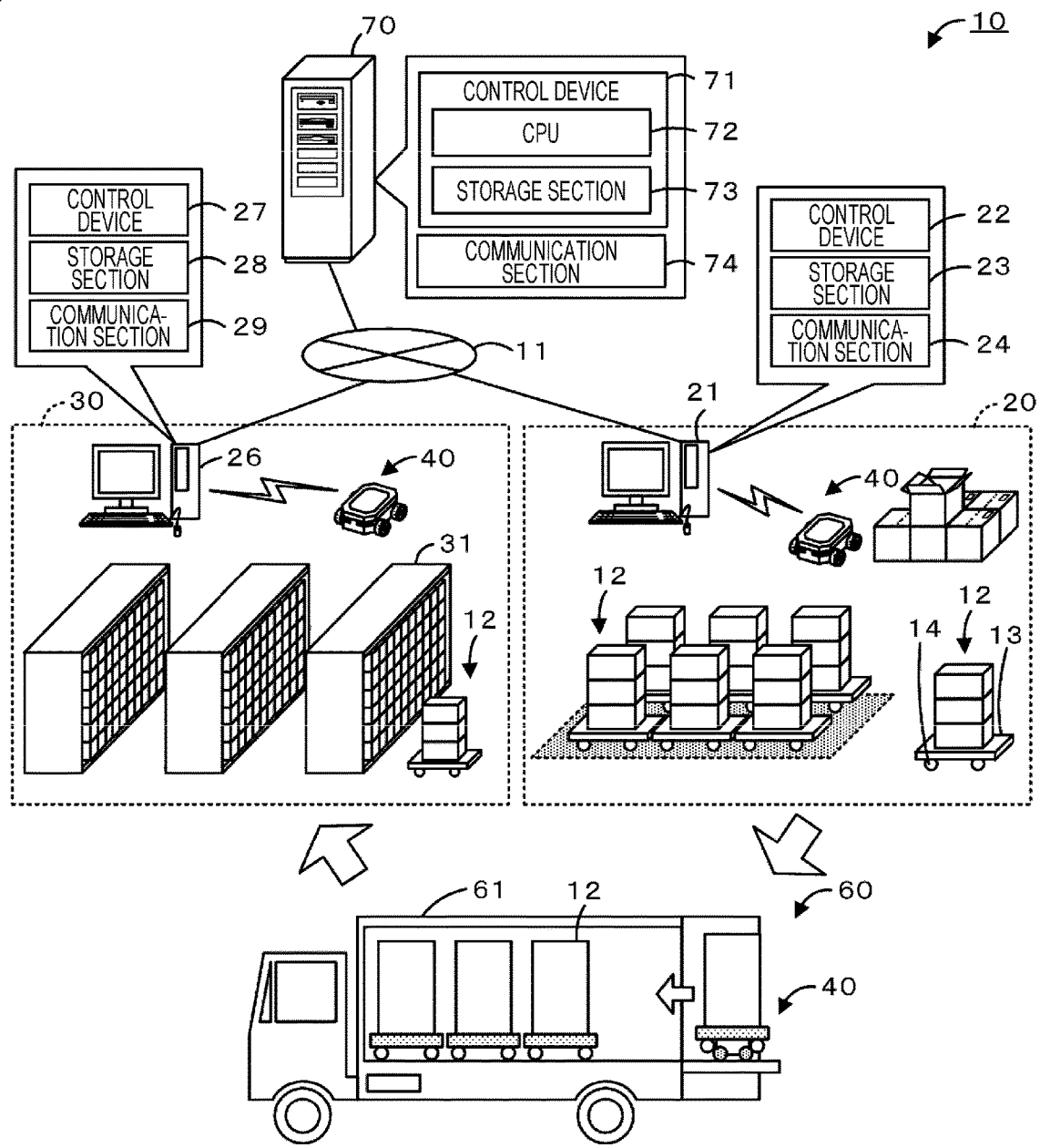
FIG. 1 is a schematic explanatory view illustrating an example of delivery system 10.
Figure 2:
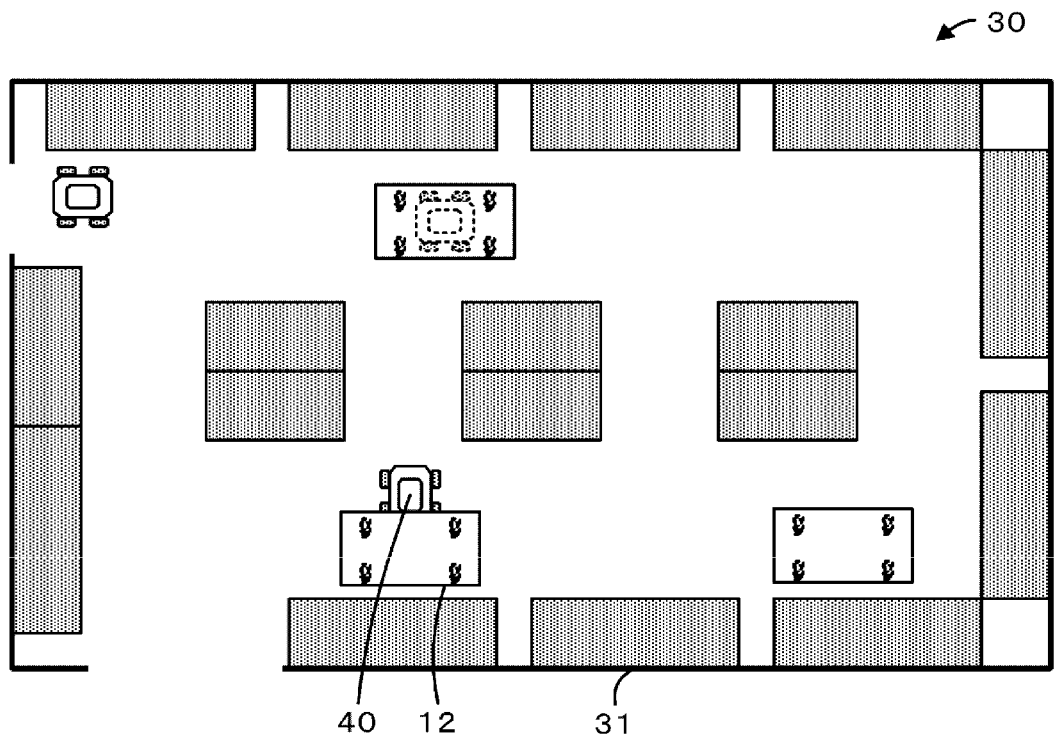
FIG. 2 is an explanatory view illustrating an example of shop 30.
Figure 3:
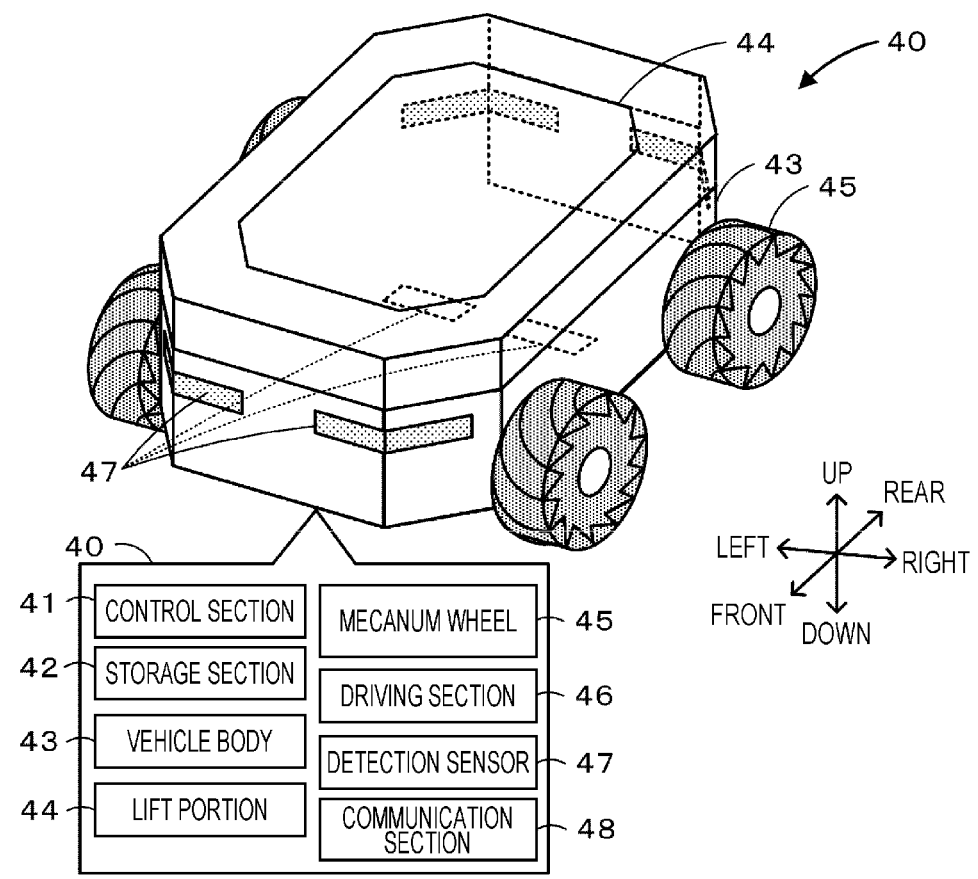
FIG. 3 is an explanatory view illustrating an example of automatic moving device 40.

Embodiments of the present disclosure will be described with reference to the accompanying drawings. FIG. 1 is a schematic explanatory view illustrating an example of delivery system 10. FIG. 2 is an explanatory view illustrating an example of shop 30. FIG. 3 is an explanatory view illustrating an example of automatic moving device 40. FIG. 4 is an explanatory view of automatic moving device 40 connected to cart 12. Delivery system 10 is a system for delivering an article to a storage chamber in which multiple carts 12 are disposed by using a transporter that accommodates and delivers cart 12 on which the article is loaded in a cargo chamber. Here, the "article" is not particularly limited as long as it is for delivery, and may include, for example, an industrial article including a machine, a device, a unit, a component, or the like of a device, a consumer article, a food, a fresh article, or the like that is generally used for daily use. Examples of the transporter include a vehicle such as a train, a ship, and an aircraft in addition to delivery vehicle 60. Examples of the "storage chamber" include logistics center 20, a warehouse, and shop 30 in which articles are accumulated. Here, for convenience of explanation, delivery system 10 for delivering commodities such as consumer article and fresh article by delivery vehicle 60 from logistics center 20 serving as a delivery source to shop 30 serving as a delivery destination will be mainly described. In the present embodiment, it is assumed that the left-right direction, the front-rear direction, and the up-down direction are as illustrated in the respective drawings.

Cart 12 includes loading section 13 and caster 14. Loading section 13 is a plate-shaped member for loading articles. Caster 14 has wheels for traveling cart 12, and is disposed on a lower surface side of loading section 13. Cart 12 may be a car cart. Logistics center 20 is a location for accumulating articles and delivering the articles to shops 30 or other logistics centers 20 in various locations. Logistics center 20 includes one or more automatic moving devices 40 that can automatically move cart 12. Logistics center 20 has, for example, a specific area on the floor as an accumulation area corresponding to a delivery destination. In logistics center 20, an operator, an arm robot (not illustrated), or the like performs a work of placing the article on cart 12 corresponding to the delivery destination. Shop 30 displays and sells the delivered articles. Shop 30 has one or more automatic moving devices 40 that can automatically move cart 12. As illustrated in FIG. 2, shop 30 has display shelf 31 on which the articles are displayed, and the operator displays the articles on display shelf 31.

As illustrated in FIG. 1, delivery system 10 includes logistics PC 21, shop PC 26, automatic moving device 40, and management server 70. Logistics PC 21 is disposed in logistics center 20 and performs product management or the like in logistics center 20. Logistics PC 21 includes control device 22, storage section 23, and communication section 24. Control device 22 has a CPU, and controls the entire device. Storage section 23 stores various application programs and various data files. Communication section 24 communicates with an external device such as automatic moving device 40. In addition, communication section 24 exchanges information with management server 70 and shop PC 26 via network 11. Shop PC 26 is disposed in shop and performs product management or the like in shop 30. Shop PC 26 includes control device 27, storage section 28, and communication section 29. Control device 27 has a CPU, and controls the entire device. Storage section 28 stores various application programs and various data files. Communication section 29 communicates with an external device such as automatic moving device 40. In addition, communication section 29 exchanges information with management server 70 and logistics PC 21 via network 11.

Automatic moving device 40 is a vehicle that automatically moves cart 12. Automatic moving device 40 performs a work of accumulating, carrying-in, and carrying-out cart 12 for which the delivery destination is specified. Automatic moving device 40 enters a space between casters 14 on the lower surface side of loading section 13 of cart 12, connects loading section 13 to cart 12 by the same from below with lift portion 44, and moves cart 12. Automatic moving device 40 may be an Automatic Guided Vehicle (AGV) that moves on a predetermined road, or may be an Autonomous Mobile Robot (AMR) that detects the surroundings and moves on a free route. Here, automatic moving device having the AMR configuration will be described.

As illustrated in FIGS. 3 and 4, automatic moving device 40 includes control section 41, storage section 42, vehicle body 43, lift portion 44, mecanum wheel 45, driving section 46, detection sensor 47, and communication section 48. Control section 41 is a controller for controlling the entire device of automatic moving device 40. Control section 41 outputs control signals and the like to lift portion 44, driving section 46, and communication section 48, and inputs input signals from detection sensor 47 and communication section 48. Control section 41 grasps a moving direction, a moving distance, a current position, and the like of automatic moving device 40 based on a driving state of driving section 46 and the like. Storage section 42 stores various application programs and various data files. Storage section 42 stores, for example, schedule information including a schedule of cart 12, a usage map in the storage chamber, and the like. Vehicle body 43 is a main body of a vehicle, on which control section 41, storage section 42, lift portion 44, and communication section 48 are installed, mecanum wheel 45 is disposed on a side surface, and detection sensor 47 is disposed on a front surface and a rear surface. Lift portion 44 is configured to be connected to cart 12 by pushing the lower surface of loading section 13 upward with respect to vehicle body 43 of automatic moving device 40 (refer to FIG. 4). Mecanum wheel 45 has a structure in which multiple rollers pivotally supported so as to be freely rotatable at an inclination of 45° with respect to the axle are disposed on a grounding surface side. Automatic moving device 40 includes four mecanum wheels 45, and is configured to be capable of executing movement, super pivot turn, pivot turn, gentle turn, and the like of automatic moving device 40 in all directions by independently rotating each thereof in the front direction or the rear direction. Here, mecanum wheel 45 is also simply referred to as a wheel. Driving section 46 is a motor connected to each mecanum wheel 45 to rotationally drive connected mecanum wheel 45, thereby driving automatic moving device 40 for traveling. Detection sensor 47 detects an object, an obstacle, or a distance between them that are present around automatic moving device 40. Detection sensor 47 detects the presence or distance of the object, for example, by irradiating light such as a laser, sound waves, or the like, to the periphery, and detecting a reflected wave. Detection sensor 47 is configured to be able to detect the presence of the object in an area around the entire outer periphery of automatic moving device 40. In addition, detection sensor 47 is also disposed at the lower portion of vehicle body 43, so that after passing through the obstacle, the obstacle can be detected again. In addition, detection sensor 47 includes a gyro sensor, so that the vehicle body direction, the disposition angle, and the like can be grasped. Control section 41 controls the movement or stoppage of automatic moving device 40 based on the information from detection sensor 47. Communication section 48 wirelessly communicates information with external devices such as logistics PC 21 and shop PC 26. Control section 41 moves to the position of cart 12 based on a command obtained from logistics PC 21 via communication section 48, connects to cart 12, and then moves cart 12 to the disposition position of the moving destination along a set moving route.

Delivery vehicle 60 is a vehicle that loads and delivers one or more carts 12. Delivery vehicle 60 loads cart 12 in cargo chamber 61 at logistics center 20, delivers the article to shop 30 serving as the delivery destination, and then returns empty cart 12 to logistics center 20. In the present embodiment, the delivery of cart 12 is performed by delivery vehicle 60 of a truck, however, the configuration is not particularly limited to this, and may be performed by a transporter such as a train, a ship, or an aircraft.

Management server 70 is a device that manages delivery system 10. Management server 70 includes control device 71, storage section 73, and communication section 74. Control device 71 includes CPU 72, and controls the entire device. Storage section 73 stores various application programs and various data files. Storage section 73 stores layout information including layout information of each storage chamber, delivery schedule information including the type and number of articles to be delivered from the delivery source to the delivery destination, and the like. The delivery of cart 12 is executed based on the layout information and the delivery schedule information.

Figure 5:
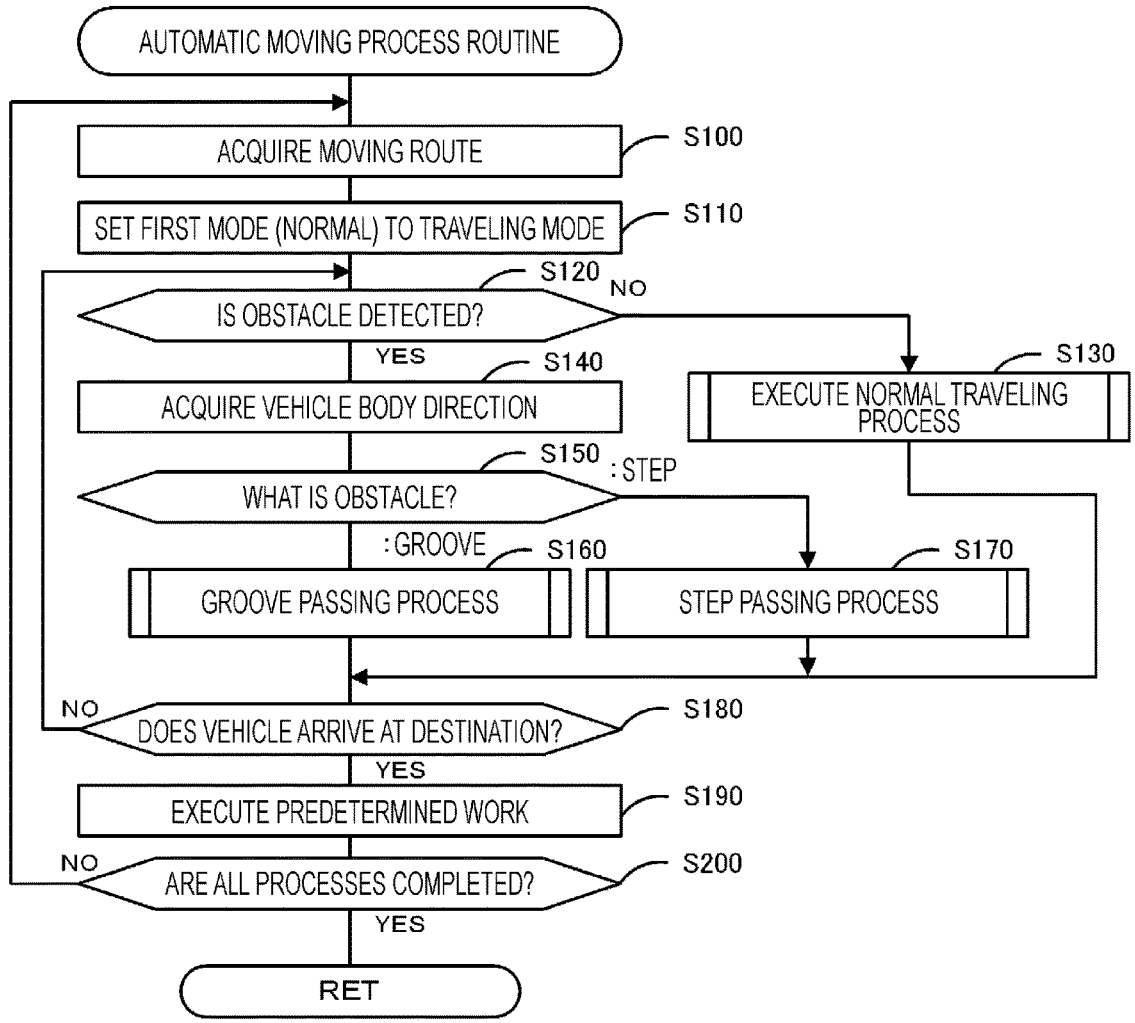
FIG. 5 is a flowchart illustrating an example of an automatic moving process routine.

Next, in delivery system 10 configured as described above, a process in which automatic moving device 40 automatically moves cart 12 in logistics center 20 or shop 30 will be described. Here, a case where automatic moving device 40 moves cart 12 in shop 30 will be mainly described. FIG. 5 is a flowchart illustrating an example of an automatic moving process routine executed by control section 41 of automatic moving device 40. This routine is stored in storage section 42, executed after receiving an automatic moving instruction from shop PC 26. When this routine is started, control section 41 acquires, from shop PC 26, a moving route from a departure point to the target point (S100). Control section 41 acquires, for example, a moving route from a standby position of automatic moving device 40 to a receiving position of cart 12, a moving route from the receiving position to the disposition position of display shelf 31, and the like.

Next, control section 41 sets a first mode (normal mode) to the traveling mode (S110), and determines whether an obstacle of a road surface is detected based on a detection result of detection sensor 47 (S120). Examples of the obstacle of the road surface include a groove and a step. Here, the term "groove" means an obstacle in which a part of a certain road surface is located below, and the term "step" means an obstacle in which the road surface changes upward or downward. When no obstacle is detected on the road surface, control section 41 executes normal traveling process (S130). In the normal traveling process, control section 41 controls driving section 46 to rotationally drive mecanum wheel 45 in the first mode. The first mode is a driving condition of driving section 46 on the road surface without obstacle. In the first mode, the driving condition of driving section 46 capable of securing a relatively high acceleration and moving speed while suppressing an increase in power consumption is empirically obtained, and is set to the obtained driving condition. In addition, in the traveling drive process, control section 41 executes lateral movement for reversing the front-rear wheels, oblique movement for rotating the diagonal wheels in the same direction, or the like while giving higher priority to moving forward and rearward for rotating all the wheels in the same direction in consideration of the current vehicle body direction and the direction to the target point. Next, control section 41 determines whether the vehicle has arrived at the destination (S180), and executes the process in and after S120 when the vehicle has not arrived at the destination.

On the other hand, when the obstacle of the road surface is detected in S120, control section 41 acquires the current vehicle body direction from an output value of the sensor (S140), and determines whether the obstacle of the road surface is the groove or the step (S150). For example, when a part of the road surface is missing and is below, control section 41 determines that the obstacle of the road surface is the groove, and determines that the obstacle of the road surface is the step when the road surface changes upward or downward from a certain edge area and holds a constant height. Control section 41 executes predetermined groove passing process when the obstacle of the road surface is the groove (S160), and executes predetermined step passing process when the obstacle of the road surface is the step (S170). The groove passing process and the step passing process will be described in detail later. After S160 or S170, control section 41 determines whether it has arrived at the destination in S180, and executes the process in and after S120 when it has not arrived at the destination.

On the other hand, when arriving at the destination in S180, control section 41 executes a predetermined work (S190). The predetermined work includes, for example, a work of entering below cart 12 and lifting and connecting cart 12 with lift portion 44, a work of lowering lift portion 44 and separating automatic moving device 40 from cart 12, or the like. After S190, control section 41 determines whether all the processes including all the movements and the works has been completed (S200), and when all the processes have not been completed, executes the process in and after S100. On the other hand, when all the processes have been completed in S200, control section 41 terminates the process.

Figure 6:
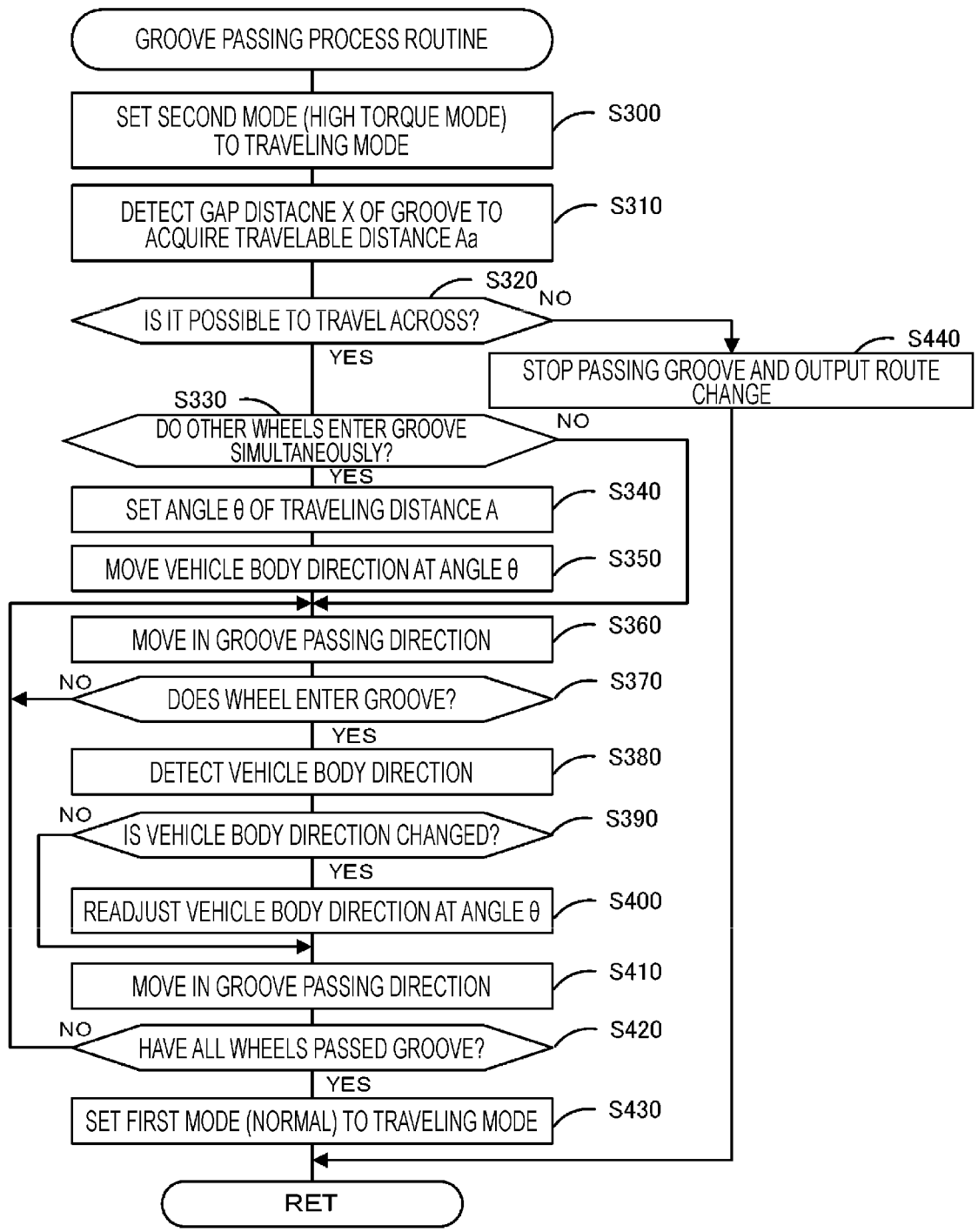
FIG. 6 is a flowchart illustrating an example of a groove passing process routine.

Next, the groove passing process in S160 will be described. FIG. 6 is a flowchart illustrating an example of the groove passing process routine. This routine is stored in storage section 42, and is executed in step S160 after the groove is detected as the obstacle of the road surface. FIG. 7 is an explanatory view illustrating an example of an angle adjustment of automatic moving device 40, in which FIG. 7A is an explanatory view illustrating when groove 32 is detected, FIG. 7B is an explanatory view illustrating the direction change, FIG. 7C is an explanatory view illustrating the groove passing of a first groove, FIG. 7D is an explanatory view illustrating the groove passing of a second groove, FIG. 7E is an explanatory view illustrating the groove passing of a third groove, and FIG. 7F is an explanatory view illustrating the groove passing of a fourth groove. FIG. 7G is a view illustrating a direction change at the time of groove entry, FIG. 7H is a view illustrating a direction readjustment, and FIG. 7I is a view illustrating a movement after readjustment. When the groove passing process routine is started, control section 41 sets the second mode (high torque mode) to the traveling mode (S300). The second mode is a driving condition of driving section 46 on the road surface with the obstacle. In the second mode, in order to secure passing of the obstacle, the driving condition of driving section 46 having a higher torque than the first mode is empirically obtained, and is set to the obtained driving condition.

Next, control section 41 detects gap distance X of groove 32 (refer to FIG. 7) and acquires travelable distance Aa (S310). Gap distance X of the groove can be calculated by using the detected value from detection sensor 47. Travelable distance Aa corresponds to a maximum value of gap distance X of the groove 32 across which automatic moving device 40 can travel by relying on only one wheel entering groove 32. Travelable distance Aa is determined to be the maximum distance by which only one wheel can enter groove 32 when the moving direction of vehicle body 43 is inclined with respect to groove 32. This travelable distance Aa can be determined based on the front-rear and left-right wheel intervals of automatic moving device 40, and corresponds to the maximum value of traveling distance A. Traveling distance A is a distance obtained based on distance L of a diagonal line between a front wheel of one wheel that first enters groove 32 and a rear wheel of the diagonal, and angle θ formed by an edge straight line and a diagonal line of groove 32 (refer to FIG. 7B). The diagonal line between the front wheel and the rear wheel is hereinafter simply referred to as a diagonal line, and the edge straight line of groove 32 is hereinafter simply referred to as groove 32. Here, a value ((L·sin θ))/3) obtained by multiplying distance L of the diagonal line by sin θ and dividing by 3 will be described as traveling distance A. At traveling distance A, the distance of each wheel in a direction orthogonal to groove 32 (traveling distance A) can be easily obtained. Control section 41 may obtain traveling distance A without using this equation (A=(L·sin θ))/3). Here, the positions of the wheels are obtained with reference to the center point of the grounding area of the wheels, and distances and the like. In addition, the diagonal line is a line connecting the front wheel that first reaches groove 32 and the rear wheel of the diagonal. In addition, angle θ uses a value on an acute angle side formed by groove 32 and the diagonal line of the wheel.

Next, control section 41 determines whether automatic moving device 40 is able to travel across groove 32 based on whether gap distance X of the groove 32 is shorter than travelable distance Aa (S320). When automatic moving device 40 is not able to travel across groove 32, that is, when the maximum value of traveling distance A is not larger than gap X, control section 41 stops the moving to groove 32, outputs the change of the moving route to shop PC 26 (S440), and terminates this routine. When traveling distance A is not larger than gap X, two or more wheels simultaneously enter groove 32, and the driving force is further reduced, so that control section 41 stops the movement of automatic moving device 40 entering groove 32 from the viewpoint of preventing stacking in groove 32. Shop PC 26 newly searches for a moving route that avoids groove 32 and transmits the same to the automatic moving device 40. Control section 41 that has received the same executes the process in and after S100 of the automatic moving process routine based on the new moving route.

On the other hand, when it is possible to travel across groove 32, control section 41 determines whether any wheel other than the wheel that first reaches groove 32 when the vehicle is advanced in the direction of the current wheel enters groove 32 (S330). Control section 41 can obtain the distance in the vertical direction with respect to groove 32, which is the distance between the wheel that first reaches groove 32 and the wheel that next reaches groove 32, as traveling distance A, and perform this determination based on whether traveling distance A is larger than gap distance X (refer to FIG. 7A). When multiple wheels enter groove 32 in the current vehicle body direction, control section 41 moves the vehicle body direction of automatic moving device 40 so that automatic moving device 40 enters in the oblique direction with respect to groove 32. That is, control section 41 sets angle θ at which traveling distance A is larger than gap distance X of the groove 32 (S340), and changes the vehicle body direction of automatic moving device 40 so that the angle formed by the diagonal line and groove 32 is equal to angle θ (S350, FIG. 7B). Here, control section 41 sets angle θ such that traveling distance A>gap distance X, that is, (L·sin θ)/3)>X. When obtaining angle θ, control section 41 may obtain angle θ at which traveling distance A is a value obtained by adding a predetermined margin to gap distance X. The margin may be set to a value at which multiple wheels do not reliably enter groove 32. As described above, when moving automatic moving device 40 in the oblique direction with respect to groove 32, control section 41 moves automatic moving device 40 at an angle at which multiple wheels do not enter groove 32. In addition, when changing the vehicle body direction, for example, it is preferable that control section 41 rotates the left front wheel and the left rear wheel in a first direction, rotates the right front wheel and the right rear wheel in a second direction opposite to the first direction, and causes the super pivot turn. By the super pivot turn, control section 41 can prevent the wheels from entering groove 32 erroneously when the vehicle body direction is changed.

After S350 or in S330, when multiple wheels do not enter groove 32 when the vehicle is advanced in the current wheel direction, control section 41 drives driving section 46 to move vehicle body 43 so as to pass through groove 32 (S360). At this time, control section 41 does not perform the oblique movement, a lateral movement, the pivot turn, or the like, but rotationally drives mecanum wheel 45 forward and moves vehicle body 43 forward (FIG. 7C). Next, control section 41 determines whether the wheel has entered groove 32 (S370), and when the wheel has not entered groove 32, the process for moving vehicle body 43 in S360 is continued. Control section 41 can determine whether the wheel has entered groove 32 based on a relationship between the current position of the vehicle moved by the moving process and the position of groove 32.

On the other hand, when the wheel enters groove 32 in S370, control section 41 detects the direction of vehicle body 43 (S380), and determines whether the vehicle body direction is changed (S390). Control section 41 can detect an amount of change in the vehicle body direction from a sensor value of the gyro sensor or the like. When the wheel enters groove 32, the direction of the vehicle body may change due to a height difference, but control section 41 detects the amount of change in the vehicle body direction. When the direction of vehicle body 43 changes in S390 (FIG. 7G), control section 41 readjusts the vehicle body direction so that the angle formed by the diagonal line and groove 32 is equal to set angle θ (S400, FIG. 7H). Similar to S350, control section 41 changes the direction of the vehicle body by, for example, the super pivot turn.

After S400 or in S390, when the direction of vehicle body 43 has not changed, control section 41 controls driving section 46 to move vehicle body 43 in the direction passing through groove 32 (S410). Similar to S360, control section 41 does not perform the oblique movement, the lateral movement, the pivot turn, or the like, but rotationally drives the mecanum wheel 45 forward and moves vehicle body 43 forward (FIG. 7I). Subsequently, control section 41 determines whether all the wheels have passed through groove 32 (S420). When all the wheels have not passed through groove 32, control section 41 executes the process in and after S360. That is, control section 41 moves vehicle body 43 in the direction passing through groove 32, determines whether the vehicle body direction changes each time the next wheel enters groove 32, and controls driving section 46 so that the wheel passes through groove 32 while readjusting the vehicle body direction as required (FIGS. 7D to 7F). On the other hand, when all the wheels have passed through groove 32 in S470, control section 41 sets the first mode to the traveling mode (S430), and terminates this routine. As described above, in automatic moving device 40, when groove 32 is detected as the obstacle of the road surface, the direction of vehicle body 43 (wheel) is the oblique direction with respect to groove 32, whereby two or more wheels are prevented from entering groove 32 as much as possible so as to pass through groove 32 in a state where the driving force is further secured.

Figure 8:
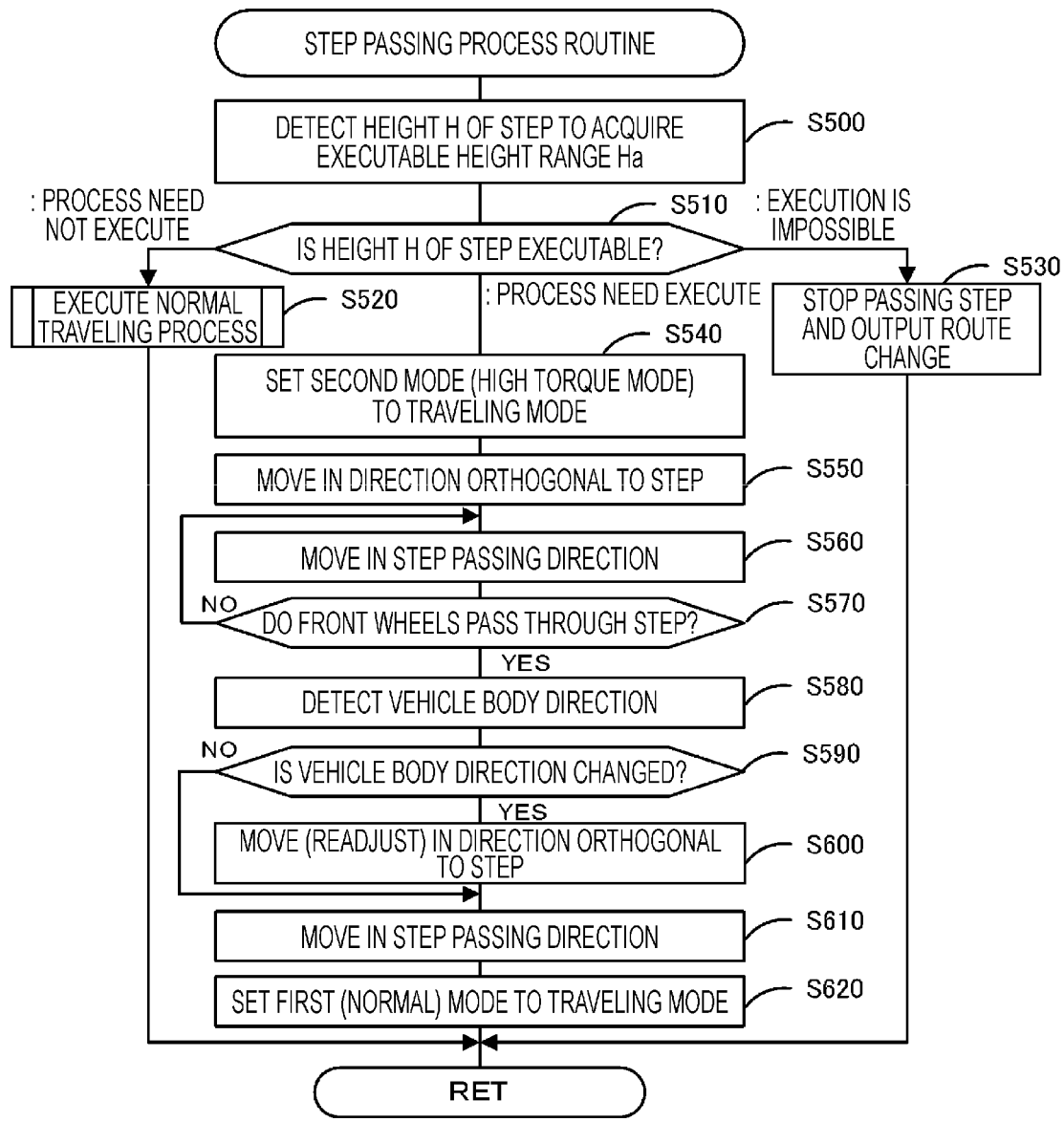
FIG. 8 is a flowchart illustrating an example of a step passing process routine.
Figure 9:
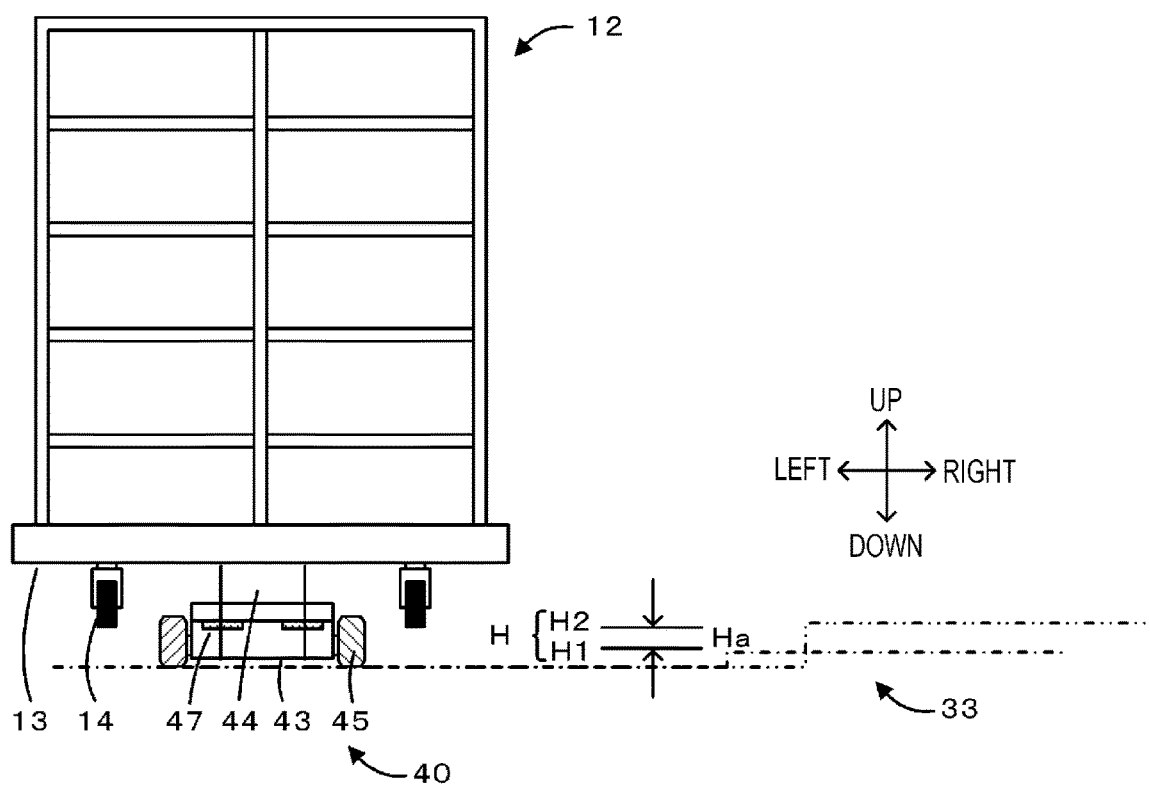
FIG. 9 is an explanatory view illustrating an example of step height H.

Next, the step passing process in S170 will be described. FIG. 8 is a flowchart illustrating an example of the step passing process routine. This routine is stored in storage section 42, and is executed in step S170 after the step is detected as the obstacle of the road surface. FIG. 9 is an explanatory view illustrating an example of step height H. FIG. 10 is an explanatory view illustrating an example of process for passing through the step of automatic moving device 40, in which FIG. 10A is a view illustrating when step 33 is detected, FIG. 10B is a view illustrating the direction change, FIG. 10C is a view illustrating the step passing of the front wheel, FIG. 10D is a view in which the vehicle body direction is changed when entering the step, FIG. 10E is a view illustrating readjustment of the vehicle body direction, and FIG. 10F is a view illustrating the step passing of the rear wheel. When the step passing process routine is started, control section 41 acquires height H of step 33 and execution height range Ha requiring the step passing process based on the detected value of detection sensor 47 (S500, FIG. 10A). As illustrated in FIG. 9, for example, execution height range Ha is set between maximum height H1 of step 33 that does not obstruct the movement of automatic moving device 40 and minimum height H2 of step 33 at which the movement of automatic moving device 40 is disabled. Here, height H1 may be empirically set to a height that adversely affects the traveling, for example, such as being unable to cross step 33 or being repelled by step 33 when vehicle body 43 enters in the oblique direction. In addition, height H1 may be set in consideration of the presence or absence of the loading deviation of cart 12 when automatic moving device 40 rides on step 33. In addition, height H2 may be set in consideration of the presence or absence of contact with step 33 of the loaded cart 12.

Next, control section 41 examines a relationship between height H of step 33 and execution height range Ha (S510), and when height H is less than execution height range Ha, determines that the step passing process is unnecessary, executes the normal traveling process in the same manner as in S130, and terminates this routine. On the other hand, when height H is more than execution height range Ha in S510, control section 41 determines to be unable to pass through step 33 in the step passing process, stops passing step 33, outputs the change of the moving route to shop PC 26 (S530), and terminates the routine. Shop PC 26 newly searches for a moving route that avoids step 33 and transmits the same to the automatic moving device 40. Control section 41 that has received the same executes the process in and after S100 of the automatic moving process routine based on the new moving route.

On the other hand, when height H of step 33 is within execution height range Ha, control section 41 sets the second mode (high torque mode) to the traveling mode (S540), and moves vehicle body 43 in the direction in which the wheel direction is orthogonal to the edge straight line of step 33 (S550, FIG. 10B). Here, control section 41 moves vehicle body 43 so that mecanum wheel 45 faces step 33. The edge straight line of step 33 will be simply referred to as step 33 hereinafter. When changing the vehicle body direction, for example, it is preferable that control section 41 rotates the left front wheel and the left rear wheel in the first direction, rotates the right front wheel and the right rear wheel in the second direction opposite to the first direction, and causes the super pivot turn. By the super pivot turn, control section 41 can prevent the wheel from erroneously hitting step 33 when the vehicle body direction is changed (refer to FIG. 10B). In a case where vehicle body 43 is already orthogonal to step 33 when step 33 is detected, the process of S550 can be omitted.

Next, control section 41 drives driving section 46 to move vehicle body 43 so as to pass through step 33 (S560). At this time, control section 41 does not perform the oblique movement, the lateral movement, the pivot turn, or the like, rotationally drives mecanum wheel 45 forward, and moves vehicle body 43 forward (FIG. 10C). Next, control section 41 determines whether the two wheels of the front wheel have passed through step 33 (S570), and when the wheel has not entered groove 32, the process of moving vehicle body 43 in S560 is continued. Control section 41 can determine whether the wheel has passed through step 33 based on the relationship between the current position of the vehicle moved by the moving process and the position of step 33.

On the other hand, when the front wheel has passed through step 33 in S570, control section 41 detects the direction of vehicle body 43 (S580), and determines whether the vehicle body direction has changed (S590). Control section 41 can detect a change in the vehicle body direction from the sensor value of the gyro sensor or the like. When the wheel enters step 33, the height difference or the shock may cause the vehicle body direction to change, but control section 41 detects the change in the vehicle body direction. When the vehicle body direction changes in S590 (FIG. 10D), control section 41 readjusts the vehicle body direction so that vehicle body 43 (wheel) is orthogonal to step 33 (S600, FIG. 10E). After S600 or in S590, when the vehicle body direction has not changed, control section 41 controls driving section 46 to move vehicle body 43 in a direction passing through step 33 (S610). Similar to S550, control section 41 changes the direction of the vehicle body by, for example, the super pivot turn. Similar to S560, control section 41 does not perform the oblique movement, the lateral movement, the pivot turn, or the like, rotationally drives mecanum wheel 45 forward, and moves vehicle body 43 forward (refer to FIG. 10F). Control section 41 continues the process of S610 until the two wheels of the rear wheel pass through step 33.

After S610, control section 41 sets the first mode to the driving mode (S620), and terminates this routine. As described above, in automatic moving device 40, when step 33 is detected as the obstacle of the road surface, the direction of vehicle body 43 (wheel) is caused to be orthogonal to step 33, so that the generation of a moment in the lateral direction is further suppressed when crossing step 33, and an unexpected change in the vehicle body direction is suppressed so as to pass through step 33.

Here, correspondences between the constituent elements of the present embodiment and constituent elements of the present disclosure will be clarified. Driving section 46 of the present embodiment corresponds to the driving section of the present disclosure, detection sensor 47 corresponds to the detection section, control section 41 corresponds to the control section, automatic moving device 40 corresponds to the automatic moving device, and the mecanum wheel 45 corresponds to the wheel and the mecanum wheel. In the present embodiment, an example of the control method for the present disclosure is also clarified by describing the operation of automatic moving device 40.

In automatic moving device 40 according to the present embodiment described above, when groove 32 is detected as the obstacle of the road surface, automatic moving device 40 is adjusted so as to be the oblique direction with respect to groove 32, so that the number of wheel derailments in groove 32 is further reduced so as to pass through groove 32. On the other hand, in automatic moving device 40, when step 33 is detected as the obstacle of the road surface, automatic moving device 40 is adjusted in a direction orthogonal to step 33, and both wheels simultaneously hit step 33 and pass through step 33. Therefore, in automatic moving device 40, since the vehicle moves in a more appropriate vehicle body direction in accordance with the unevenness of the road surface, it is possible to more appropriately travel against the obstacle of the road surface. In addition, when moving automatic moving device 40 in the oblique direction with respect to groove 32, control section 41 moves automatic moving device 40 at an angle at which multiple wheels do not enter groove 32.

In addition, when groove 32 is detected on the road surface, control section 41 detects gap X of groove 32, and sets the angle of the vehicle at which traveling distance A obtained based on distance L of the diagonal line between the front wheel and the diagonal rear wheel and angle θ formed by the diagonal line with groove 32 is larger than gap X. In automatic moving device 40, it is possible to travel groove 32 more appropriately using traveling distance A and gap X. In particular, in automatic moving device 40, by using distance L of the diagonal line of the wheel, it is possible to consider the wheels entering groove 32 simultaneously in consideration of the positions of the left-right and front-rear wheels when the vehicle is tilted, so that the vehicle direction can be more appropriately set. Further, when traveling distance A is not larger than gap X, control section 41 stops moving to groove 32 and performs the route change. In automatic moving device 40, when multiple wheels enter groove 32, the movement of vehicle body 43 can be secured by not causing vehicle body 43 to enter groove 32.

Further, control section 41 controls driving section 46 to change the vehicle body direction of automatic moving device 40 when passing through groove 32 of the road surface, when one wheel crosses groove 32, and when another wheel enters groove 32. In the automatic moving device 40, when multiple wheels simultaneously enter groove 32 in the current moving direction, the traveling can be continued by changing the vehicle body direction so that multiple wheels do not enter groove 32. In addition, control section 41 moves automatic moving device 40 in a direction orthogonal to step 33 when step 33 is equal to or larger than predetermined height H1. In automatic moving device 40, it is easy to cross step 33 having predetermined height H1 or more. In addition, in step 33 having a height less than predetermined height H1, it is possible to quickly move without changing the vehicle body direction.

Furthermore, when detecting the obstacle of the road surface, control section 41 controls driving section 46 in the high torque mode in which the torque of driving section 46 is further increased. In automatic moving device 40, since the vehicle enters the obstacle of the road surface in a state of high torque, it is easy to cross the obstacle such as step 33 or groove 32. In addition, when the vehicle body direction of automatic moving device 40 changes when passing through the obstacle of the road surface, control section 41 readjusts the vehicle body direction using the detection result of detection sensor 47. In automatic moving device 40, it is possible to more appropriately pass through the obstacle by readjusting the vehicle body direction while passing through the obstacle of the road surface. In addition, detection sensor 47 is capable of detecting the obstacle during vehicle body 43 passes therethrough, control section 41 is capable of detecting a change amount in the vehicle body direction, and readjusts the vehicle body direction based on the change amount in the vehicle body direction and the direction of the obstacle. In addition, after at least one wheel of the front wheels passes through the obstacle, control section 41 detects the position of the obstacle, and determines whether the vehicle body direction has changed before passing through the obstacle. In automatic moving device 40, even if the vehicle body direction changes when passing through the obstacle of the road surface, a more appropriate vehicle body direction can be maintained.

In addition, automatic moving device 40 includes at least four mecanum wheels 45 having a structure in which multiple rollers inclined with respect to the axle and pivotally supported so as to be freely rotatable as wheels are disposed on the grounding surface side, and driving section 46 drives each of the mecanum wheels. In automatic moving device 40, by having mecanum wheel 45, it is possible to freely move in the front-rear direction, the left-right direction, or the like. In addition, when groove 32 is detected on the road surface, control section 41 adjusts the moving direction so that the wheel enters in the oblique direction with respect to groove 32, whereas when step 33 is detected on the road surface, adjusts the moving direction so that the wheel is facing step 33. In automatic moving device 40, even in a case where the vehicle moves in a direction different from the vehicle body direction by mecanum wheel 45, the vehicle body direction is determined with reference to the direction of the wheel, so that the vehicle can travel more appropriately against obstacles on the road surface.

It is to be understood that the present disclosure is not limited to the embodiments described above in any way, and may be executed in various forms as long as the embodiments belong to the technical scope of the present disclosure.

For example, in the above embodiments, when groove 32 is detected on the road surface, gap X of groove 32 is detected, and the angle of the vehicle in which traveling distance A obtained based on distance L of the diagonal line between the front wheel and the diagonal rear wheel, and angle θ formed by groove 32 and the diagonal line is larger than gap X is set, however, the configuration is not limited to this, and the angle of the vehicle may be set without using distance L of the diagonal line, traveling distance A. Control section 41 may obtain the angle of the vehicle where multiple wheels do not enter groove 32.

In the above embodiments, control section 41 requests shop PC 26 of the external device to change the route when traveling distance A is not larger than gap distance X of grooves 32, but the device for setting the route is not particularly limited to this as long as the route can be changed, and control section 41 may set a new traveling route using layout information of shop 30 or the like. Alternatively, management server 70 or the like may set a new traveling route. Also in automatic moving device 40, the movement of cart 12 can be performed with higher reliability.

In the above embodiments, control section 41 requests shop PC 26 of the external device to change the route when step 33 has a height exceeding execution height range Ha, but the device for setting the route is not particularly limited to this as long as the route can be changed, and control section 41 may set a new traveling route using layout information of shop 30 or the like. Alternatively, management server 70 or the like may set a new traveling route. Also in automatic moving device 40, the movement of cart 12 can be performed with higher reliability.

In the above embodiments, when vehicle body 43 is caused to enter the obstacle after detecting the obstacle of the road surface, control section 41 controls driving section 46 in the second mode (high torque mode) in which the torque of driving section 46 is further increased, however, the configuration is not particularly limited to this, and the shift to the high torque mode may be omitted. Also by automatic moving device 40, since the vehicle body direction is adjusted with respect to the obstacle of the road surface and passes through the obstacle, it is possible to travel more appropriately against the obstacle of the road surface. When automatic moving device 40 passes through the obstacle of the road surface, it is preferable to move in the high torque mode because it is easier to pass through the obstacle of the road surface.

In the above embodiments, although control section 41 has been described as readjusting the vehicle body direction in a case where the vehicle body direction changes using the detected value of detection sensor 47 in S380 to S400 after the wheel enters groove 32, however, the configuration is not particularly limited to this, and may perform processing for detecting the change in the vehicle body direction or may not readjust the vehicle body direction changed at the time of entering groove 32. Also in automatic moving device 40, since vehicle body 43 is adjusted so as to be the oblique direction with respect to groove 32 after groove 32 is detected, the number of wheel derailments in groove 32 is further reduced and the vehicle passes through groove 32, it is possible to travel more appropriately against the obstacle of the road surface. In a case where the vehicle body direction is not detected and readjusted after the wheel enters groove 32, automatic moving device 40 may omit detection sensor 47 provided below vehicle body 43.

In the above embodiments, although control section 41 has been described as readjusting the vehicle body direction in a case where the vehicle body direction changes using the detected value of detection sensor 47 in S580 to 600 after the wheel enters step 33, however, the configuration is not limited to this, and may perform processing for detecting the change in the vehicle body direction or may not readjust the vehicle body direction changed when entering step 33. Also in automatic moving device 40, since vehicle body 43 is adjusted so as to be orthogonal to step 33 after step 33 is detected, it is possible to travel more appropriately against the obstacle of the road surface. In a case where the vehicle body direction is not detected and readjusted after the wheel enters step 33, automatic moving device 40 may omit detection sensor 47 provided below vehicle body 43.

Figure 11:
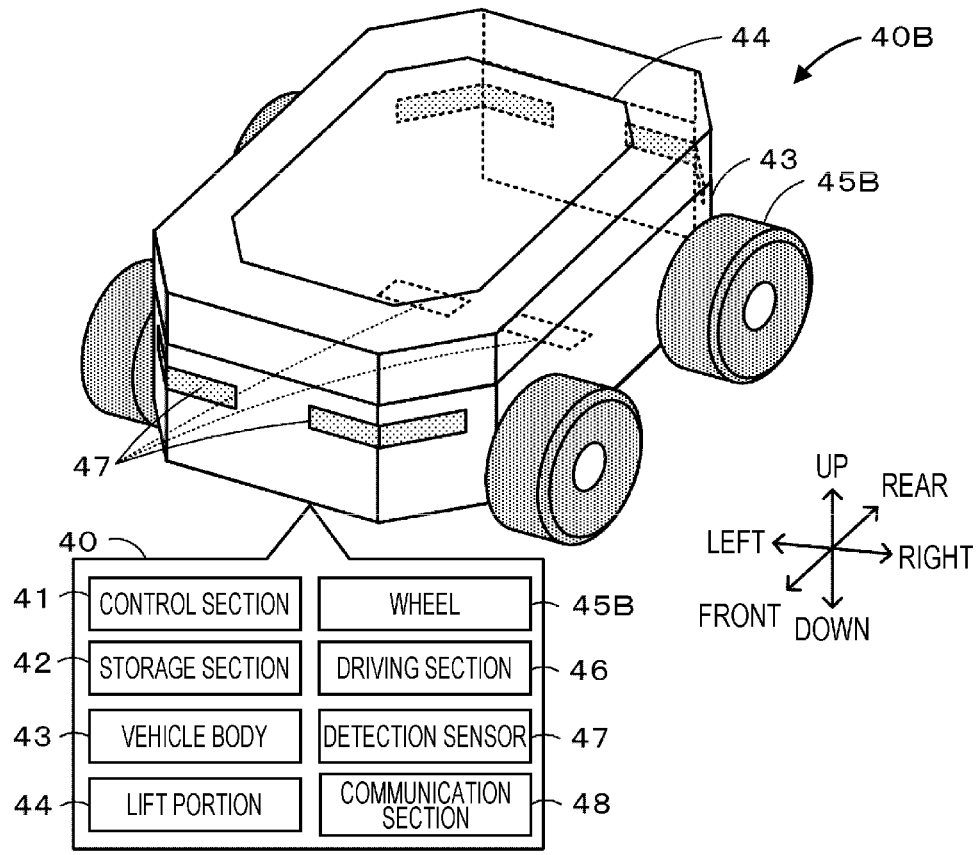
FIG. 11 is an explanatory view illustrating another example of automatic moving device 40B.

In the above embodiments, automatic moving device 40 is described as if the wheel is mecanum wheel 45, however, the configuration is not particularly limited to this. FIG. 11 is an explanatory view illustrating an example of another automatic moving device 40B. Automatic moving device 40B includes ordinary wheels 45B on which tires are mounted. In automatic moving device 40B, although it is impossible to freely move in the front-rear and left-right directions such as lateral movement or oblique movement, it is possible to automatically move cart 12. In automatic moving device 40B, driving section 46 may be configured to be able to independently drive each of wheels 45B. In automatic moving device 40B, the super pivot turn or the pivot turn can be executed. In addition, in automatic moving device 40B including ordinary wheels 45B, driving section 46 may be configured to be able to drive front wheels and/or rear wheels, and to be able to change the direction of wheels 45B by using one or more of the wheels as steering wheels. The automatic moving device may include five or more wheels, four or three wheels, or two main wheels and one or more sub-wheels. In this automatic moving device, in a case where vehicle body 43 or the wheel comes into contact with the obstacle of the road surface when changing the vehicle body direction, vehicle body 43 may be temporarily set back.

Figure 12:
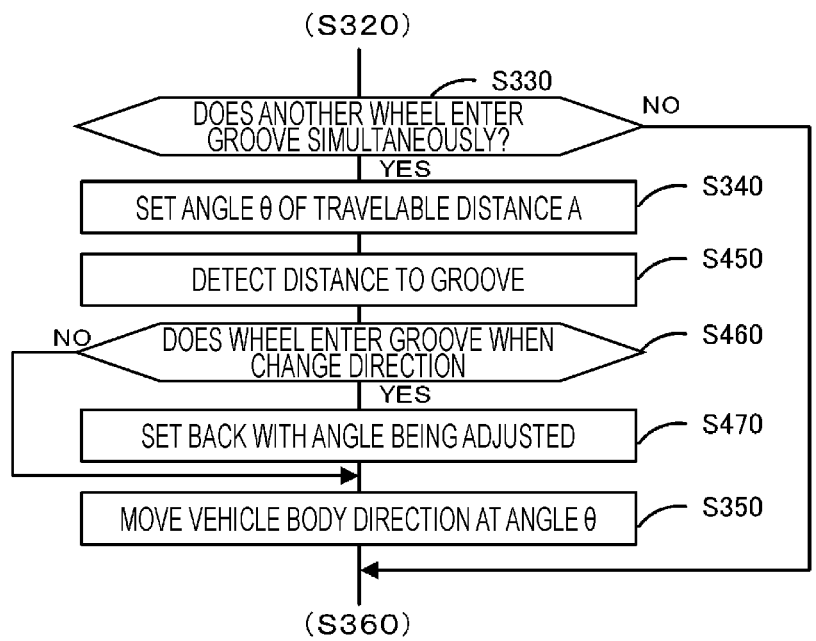
FIG. 12 illustrates a modified example of the groove passing process routine.

FIG. 12 is a flowchart illustrating an example of a modified example of the groove passing process routine. In FIG. 12, after setting angle θ of traveling distance A in S340 of the groove passing process routine described above, control section 41 detects the distance between vehicle body 43 and groove 32 (S450), determines whether wheel 45B enters groove 32 at the time of the direction change (S460), and causes the vehicle to set back as adjusting the angle when wheel 45B enters groove 32 at the time of the direction change (S470). In this automatic moving device, in a case where the vehicle is steered and moved by ordinary wheels, it is possible to prevent the wheels from entering groove 32 when changing the vehicle body direction.

Figure 13:
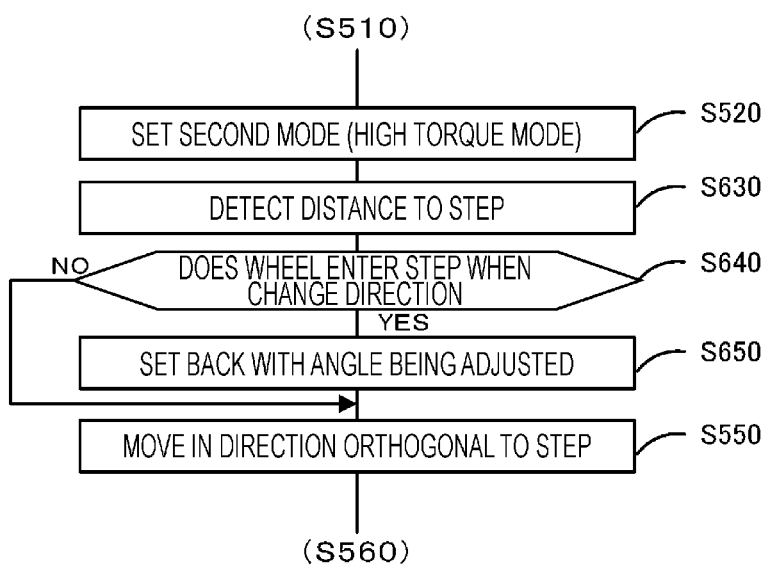
FIG. 13 illustrates a modified example of the step passing process routine.

FIG. 13 is a flowchart illustrating an example of a modified example of the step passing process routine. In FIG. 13, after setting the torque mode in S520 of the step passing process routine described above, control section 41 detects the distance between vehicle body 43 and step 33 after setting angle θ of the traveling distance A (S630), determines whether wheel 45B enters step 33 at the time of the direction change (S640), and causes the vehicle to set back as adjusting the angle when wheel 45B enters step 33 at the time of the direction change (S650). In this automatic moving device, in a case where the vehicle is steered and moved by ordinary wheels, it is possible to prevent the wheel from entering step 33 when changing the vehicle body direction.

In the above embodiments, the present disclosure has been described as delivery system 10, however, the configuration is not particularly limited to this, and may be automatic moving device 40 or a control method for automatic moving device 40.

Here, the present disclosure may be configured as follows. For example, in the automatic moving device according to the present disclosure, when the groove is detected on the road surface, the control section may detect gap X of the groove, and may set an angle of a vehicle for which traveling distance A obtained based on distance L of the diagonal line between the front wheel and the diagonal rear wheel, and angle θ formed by the groove and the diagonal line is larger than gap X. In this automatic moving device, it is possible to travel the groove more appropriately by using traveling distance A and gap X. In particular, in this automatic moving device, when distance L of the diagonal line of the wheel is used, it is possible to consider the wheels entering the groove simultaneously in consideration of the positions of the left-right and front-rear wheels when the vehicle is tilted, so that the vehicle direction can be more appropriately determined. In the automatic moving device, the control section may stop moving to the groove and change the route when traveling distance A is not larger than gap X. In this automatic moving device, when multiple wheels simultaneously enter the groove, it is possible to secure the movement of the vehicle body by not causing the vehicle body to enter the groove.

In the automatic moving device according to the present disclosure, the control section may control the driving section so that the direction of the vehicle body of the automatic moving device is changed when passing through the groove of the road surface and another wheel enters the groove when the one wheel crosses the groove. In this automatic moving device, when multiple wheels simultaneously enter the groove in the current moving direction, the traveling can be continued by changing the direction of the vehicle body so that the multiple wheels do not enter the groove.

In the automatic moving device according to the present disclosure, the control section may move the automatic moving device in the direction orthogonal to the step when the step is a predetermined height or more. In this automatic moving device, it is easy to cross the step of the predetermined height or more. In addition, in the step having a height less than the predetermined height, the vehicle body can be quickly moved without changing the direction of the vehicle body. Here, the "predetermined height" may be empirically set to a height that adversely affects the traveling, for example, such as being unable to cross the step or being repelled by the step when the vehicle body enters in the oblique direction.

In the automatic moving device according to the present disclosure, the control section may control the driving section in the high torque mode in which the torque of the driving section is further increased when detecting the obstacle of the road surface. In this automatic moving device, since it enters the obstacle of the road surface in a state of high torque, it is easy to cross the obstacle such as the step or the groove.

In the automatic moving device according to the present disclosure, the control section may readjust the direction of the vehicle body using the detection result of the detection section when the direction of the vehicle body of the automatic moving device changes when passing through the obstacle of the road surface. In this automatic moving device, it is possible to more appropriately pass through the obstacle by readjusting the direction of the vehicle body while passing through the obstacle of the road surface. In the automatic moving device, the detection section may be capable of detecting the obstacle where the vehicle body is passing by, the control section may be capable of detecting the change amount of the vehicle body, and readjusting the direction of the vehicle body based on the change amount of the vehicle body and the direction of the obstacle. In addition, the control section may detect the position of the obstacle after at least one of the front wheels passes through the obstacle, and determine whether the direction of the vehicle body has changed with respect to before passing through the obstacle.

The automatic moving device according to the present disclosure may include at least four wheels of the mecanum wheel having a structure in which multiple rollers inclined with respect to the axle and pivotally supported so as to be freely rotatable are disposed on the grounding surface side as the wheels, and the driving section may drive the mecanum wheel. In this automatic moving device, by having a mecanum wheel, it is possible to freely move in the front-rear direction, the left-right direction, or the like. In the automatic moving device, the control section may adjust the moving direction so that the wheel enters in the oblique direction with respect to the groove when the groove is detected on the road surface, and may adjust the moving direction so that the wheel faces the step when the step is detected on the road surface. In this automatic moving device, even in a case where the vehicle body is moved in a direction different from the direction of the vehicle body by the mecanum wheel, it is possible to more appropriately travel against the obstacle of the road surface by determining the direction of the vehicle body with reference to the direction of the wheels.

A control method for an automatic moving device according to the present disclosure including a driving section configured to drive a wheel and a detection section configured to detect an obstacle of a road surface, is used in a delivery system for delivering an article, and automatically moves the article, the control method for an automatic moving device including (a) a step of controlling the driving section for moving the automatic moving device in an oblique direction with respect to a groove when the groove is detected as an obstacle of the road surface; and (b) a step of controlling the driving section for moving the automatic moving device in a direction orthogonal to a step when the step is detected as an obstacle of the road surface.

In the control method for an automatic moving device, similarly to the automatic moving device described above, since the vehicle moves in a more appropriate vehicle body direction in accordance with the unevenness of the road surface, it is possible to more appropriately travel against the obstacle of the road surface. In the control method for an automatic moving device, various modes of the automatic moving device described above may be adopted, or a step for realizing each function of the automatic moving device described above may be added.

Still further, the automatic moving device according to the present disclosure may be an automatic moving device for automatically moving an article used in a delivery system for delivering the article, the automatic moving device that includes a driving section configured to drive a wheel; a detection section configured to detect an obstacle of a road surface; and a control section for controlling the driving section to move the automatic moving device in an oblique direction with respect to a groove when the groove is detected as an obstacle of the road surface.

Still further, the automatic moving device according to the present disclosure may be an automatic moving device used in a delivery system for delivering an article and automatically moving the article, the automatic moving device that includes a driving section configured to drive a wheel; a detection section configured to detect an obstacle of a road surface; and a control section for controlling the driving section for moving the automatic moving device in a direction orthogonal to a step when the step is detected as an obstacle of the road surface.

INDUSTRIAL APPLICABILITY

The automatic moving device and the control method for an automatic moving device of the present disclosure can be used in the technical field of a commodity distribution system for delivering commodities.

REFERENCE SIGNS LIST 10 delivery system, 11 network, 12 cart, 13 loading section, 14 caster, 20 logistics center, 21 logistics PC, 22 control device, 23 storage section, 24 communication section, 26 shop PC, 27 control device, 28 storage section, 29 communication section, 30 shop, 31 display shelf, 32 groove, 33 step, 40 automatic moving device, 41 control section, 42 storage section, 43 vehicle body, 44 lift portion, 45 mecanum wheel, 45B wheel, 46 driving section, 47 detection sensor, 48 communication section, 60 delivery vehicle, 61 cargo chamber, 70 management server, 71 control device, 72 CPU, 73 storage section, 74 communication section

The invention claimed is:

1. An automatic moving device used in a delivery system for delivering an article and automatically moving the article, the automatic moving device comprising:

a motor configured to drive a wheel;

a detection sensor configured to detect an obstacle of a road surface; and a control section including a processor configured to execute an automatic moving process including acquiring a moving route, setting a traveling mode of the automatic moving device to a first mode, detecting the obstacle of the road surface based on a detection result of the detection sensor, when the obstacle of the road surface is detected acquiring a current vehicle body direction of the automatic moving device, determining whether the obstacle is a groove or a step, and executing a groove passing process when the obstacle is a groove, and executing a step passing process when the obstacle is a step, wherein the groove passing process includes setting the traveling mode of the automatic moving device to a second mode in which the motor has a higher torque than in the first mode, calculating a gap distance of the groove, determining a traveling distance of the automatic moving vehicle based on a wheel interval of the automatic moving device, setting an angle at which the automatic moving device is moved in an oblique direction with respect to the groove such that the traveling distance is greater than the gap distance, and controlling the automatic moving device to move at the angle until all wheels of the automatic moving vehicle have passed through the groove, and wherein the step passing process includes setting the traveling mode of the automatic moving device to the second mode, and controlling the automatic moving device to move in a direction orthogonal to the step until all wheels of the automatic moving vehicle have passed over the step.

2. The automatic moving device according to claim 1, wherein the traveling distance is determined based on a diagonal line between a front wheel and a diagonal rear wheel.

3. The automatic moving device according to claim 2, wherein the control section stops the automatic moving device from moving to the groove and changes a route when the traveling distance is less than the gap.

4. The automatic moving device according to claim 1, wherein the control section controls the motor so that the automatic moving device moves at the angle when passing through the groove of the road surface and when one wheel crosses the groove and another wheel enters the groove.

5. The automatic moving device according to claim 1, wherein the control section moves the automatic moving device in the direction orthogonal to the step when the step is a predetermined height or more.

6. The automatic moving device according to claim 1, wherein the control section readjusts a direction of a vehicle body using the detection result of the detection sensor when the direction of the vehicle body of the automatic moving device changes when passing through the obstacle of the road surface.

7. The automatic moving device according to claim 1, wherein at least four wheels of a mecanum wheel having a structure in which multiple rollers inclined with respect to an axle and pivotally supported so as to be freely rotatable are disposed on a grounding surface side are provided as the wheels, and the motor drives the mecanum wheel.

8. The automatic moving device according to claim 7, wherein the control section adjusts a moving direction so that the wheel enters in the oblique direction with respect to the groove when the groove is detected on the road surface, and adjusts the moving direction so that the wheel faces the step when the step is detected on the road surface.

9. A control method for an automatic moving device that includes a motor configured to drive a wheel and a detection sensor configured to detect an obstacle of a road surface, is used in a delivery system for delivering an article, and automatically moves the article, the control method for an automatic moving device comprising:

acquiring a moving route, setting a traveling mode of the automatic moving device to a first mode, detecting the obstacle of the road surface based on a detection result of the detection sensor, when the obstacle of the road surface is detected acquiring a current vehicle body direction of the automatic moving device, determining whether the obstacle is a groove or a step, and executing a groove passing process when the obstacle is a groove, and executing a step passing process when the obstacle is a step, wherein the groove passing process includes calculating a gap distance of the groove, determining a traveling distance of the automatic moving vehicle based on a wheel interval of the automatic moving device, setting an angle at which the automatic moving device is moved in an oblique direction with respect to the groove; such that the traveling distance is greater than the gap distance, and controlling the automatic moving device to move at the angle until all wheels of the automatic moving vehicle have passed through the groove, and wherein the step passing process includes setting the traveling mode of the automatic moving device to the second mode, and controlling the automatic moving device to move in a direction orthogonal to the step until all wheels of the automatic moving vehicle have passed over the step.

* * * * *